Nov. 11, 1952 R. E. JAMES ET AL 2,617,658
WHEELED VEHICLE FOR CHILDREN
Filed Sept. 15, 1950 2 SHEETS—SHEET 2
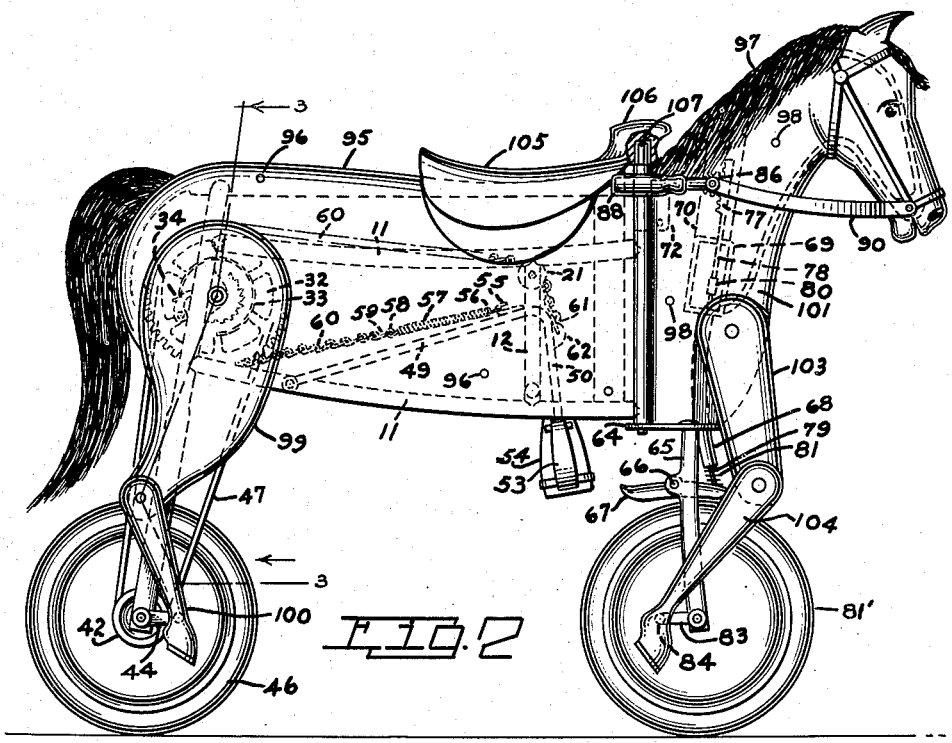
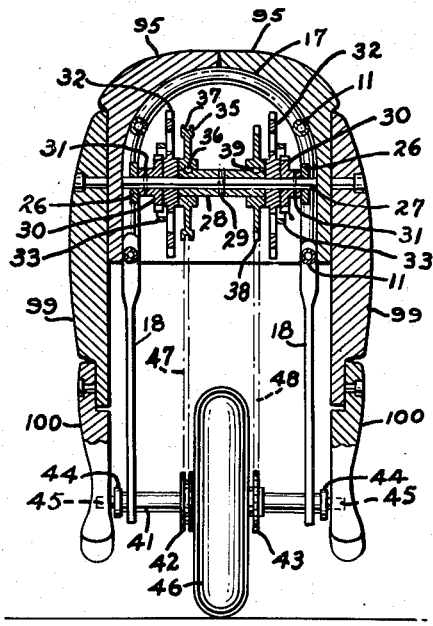
INVENTOR
RAYMOND E. JAMES
EDGAR L. PIERCE
BY J.B.Dickman, Jr.
ATTORNEY Patented Nov. 11, 1952

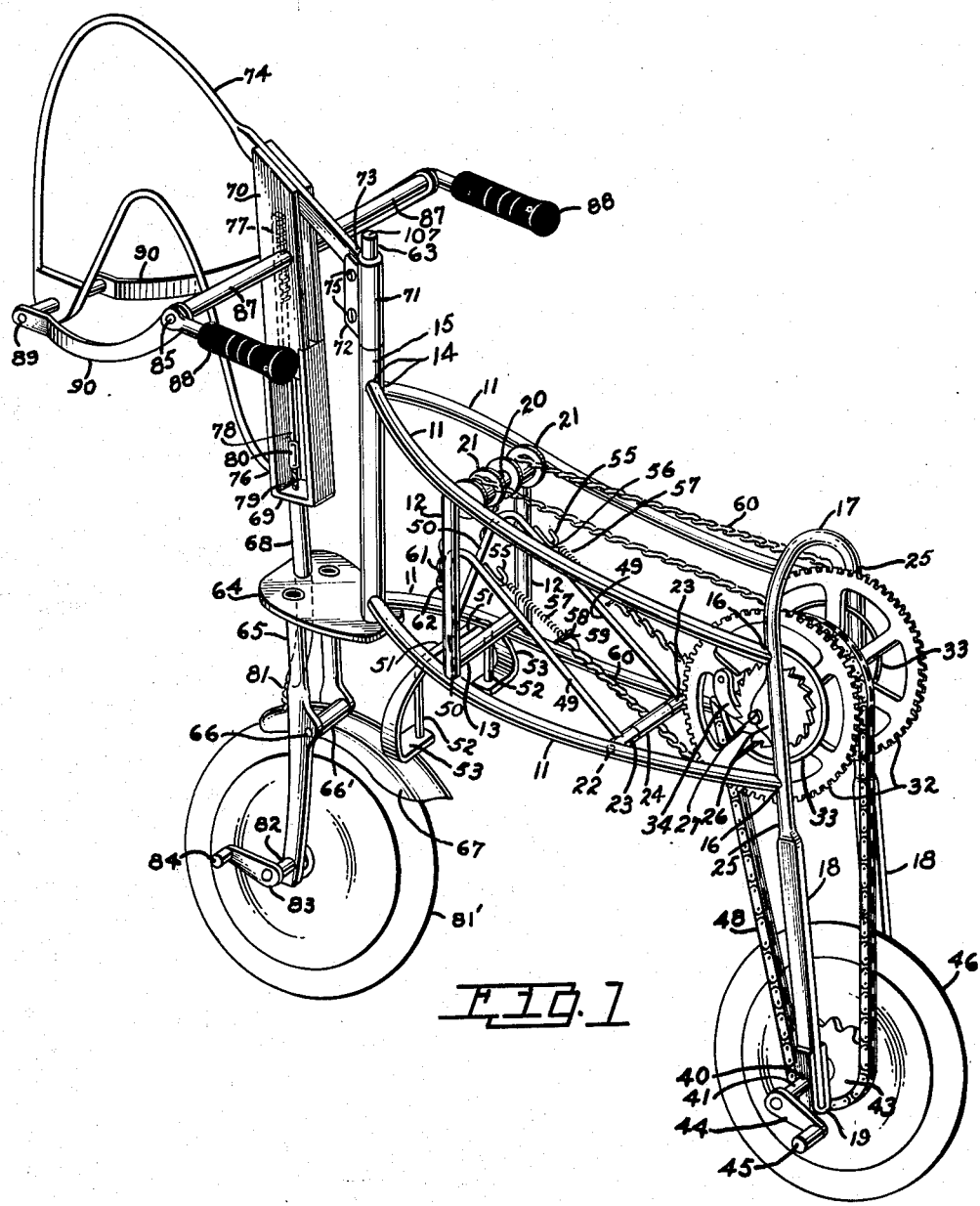

2,617,658

UNITED STATES PATENT OFFICE 2,617,658

WHEELED VEHICLE FOR CHILDREN

Raymond E. James, East Riverdale, Md., and Edgar L. Pierce, Falls Church, Va.

Application September 15, 1950, Serial No. 185,092

3 Claims. (Cl. 280—1.189)

The present invention relates to a vehicle and has for one of its objects to produce a vehicle in the form of an animal for the use and amusement of children.

Another object of the present invention is the provision of a vehicle simulating an animal, the legs being jointed and pivotally connected.

A still further object of the present invention is the provision of means for propelling the vehicle.

A still further object of the present invention is the provision of a frame supporting the mechanism for operating the vehicle.

A still further object of the present invention is the provision of a brake means for controlling the speed, or for stopping the vehicle.

A still further object of the present invention is the provision of a chain or belt drive.

A still further object of the present invention is the provision of free wheeling of the vehicle.

A still further object of the present invention is the provision of means for holding the propelling means in retracted position.

A still further object of the present invention is the provision of means for steering the vehicle associated with the brake means.

These and other objects and advantages of the present invention will be apparent during the course of the following description in which the like numerals are employed to designate like parts throughout the several views.

Figure 1 is a side elevational view of the vehicle.

Figure 2 is a perspective view of the frame of the vehicle and illustrating the propelling and brake mechanism.

Figure 3 is a tranverse section taken on line 3—3 of Figure 1 looking in the direction of the arrows.

Referring to the drawings, the numeral 10 represents the vehicle and it comprises a frame of tubular material having side rails 11 with vertical supports 12 and a lower forward transverse reinforcing bar 13. The forward ends 14 of the side rails 11 are secured to a vertical tubular housing 15, the rear ends 16 of the side rails 11 are secured to a U-shaped rod 17, the portions 18 of the rods being formed into flat strips, the ends of these strips may be uniform or they may be reinforced by a U-shaped element 19. Between the upper side rails 11 there is fixedly secured a transverse upper forward rod 20 upon which may be mounted for rotative movement rollers or sprocket wheels 21. Between the lower side rails 11 there is fixedly secured a lower rear shaft 22 upon which is mounted for pivotal movement collars 23 that are held in spaced relation by a sleeve 24. The rod portions 25 of the U-shaped member are each provided with ears 26 that support the ends of shaft 27, the shaft adapted for rotative movement. Upon the shaft 27 there is mounted a sleeve 28 that is secured to the shaft by pin 29. Also mounted on the upper rear shaft 27 adjacent each end are ratchet wheels 30 that are secured to the shaft by pins 31, and sprocket wheels 32 that are freely movable on the shaft 27. The sprocket wheels 32 each carry a spring 33 and a dog 34, the dog adapted for engagement with the ratchet wheel to impart movement to same, the spring exerting a pressure on the dog to keep the dog in engagement with the ratchet wheel. In Figure 3 two forms of drive wheels are shown mounted on shaft 27, and if it is desired to provide a belt drive for the device, a drive wheel 35 is mounted on the sleeve 28 and keyed thereto by pin 36, the peripheral edge of the wheel 35 being provided with a groove 37. If it is desired to provide a chain drive for the device a sprocket wheel 38 is mounted on the sleeve 28 and secured thereto by a pin 39.

The portions 18 of the U-shaped rod 17 adjacent the ends are provided with bores 40 that receive an axle 41, and mounted upon the axle there may be a grooved wheel 42, or as shown in Figure 2 a sprocket wheel 43 may be secured to the shaft. The ends of the axle 41 are provided with a crank element 44, the pin portion 45 adapted for engagement with an aperture in the hind legs of a horse or other animal as shown in Figures 1 and 3. Also mounted on the axle 41 and keyed thereto is a rubber tired wheel 46. If a belt drive is to be used, a belt 47 is trained around and engages the groove 37 in wheel 35, and around the grooved wheel 42, or if a chain drive is to be used a link chain 48 is trained around the sprocket wheel 38 and the sprocket wheel 43.

Secured to the collars 23 is a shaft 49, the shaft having a bent portion 50, a transverse bent portion 51 that forms an offset, and a depending portion 52. Secured to the end of the depending portion 52 is an L-shaped element 53 that forms a stirrup to which is secured a guard 54. The shaft 49 is provided with a hook 55 that receives one end 56 of spring 57, the opposite end 58 of the spring being secured to the end 59 of link chain 60. The chain is trained around the sprocket wheels 32 and the rollers 21, the end 61 of the link chain 60 engaging a hook 62 carried by the bent portion 50 of shaft 49. For clarity the link chain 60 is not shown trained around the sprocket wheels 32 in Figure 2. The spring 57 serves as a return means for the shafts and the other portions of the shafts to normal position as shown in Figure 2.

Within the tubular housing 15 is a rod 63 having secured to its bottom end a plate 64. The plate carries fork 65, the ends of the fork being provided with an aperture. Between the fork is a shaft 66, and mounted on the shaft for pivotal movement is a sleeve 66' to which is secured a guard-brake 67. A tubular housing 68 is carried by the plate 64, and secured to the top end of the housing is an open framework 69 having a closed portion 70 that serves as a housing. Mounted upon the upper end of the rod 63 is a sleeve 71 having a slotted flange 72. The slotted flange 72 receives one end 73 of rod 74 that is secured in the slot by bolts 75. The rod 74 is bent to form the outline of a head, and in the present showing the head is a horse, the end 76 of the rod 74 being secured to the open framework 69. Mounted within the housing 70 is a rack bar 77 having its lower end 78 threaded. Within the tubular housing 68 is a cable 79, one end of the cable having a threaded coupling 80 that engages the threaded end 78, the opposite end of the cable 79 being secured to the guard-brake, and interposed between the guard-brake and the bottom end of the tubular housing 68 is a spring 81 that serves as a means for keeping the guard-brake normally out of engagement with the rubber tired wheel 81'. The rubber tired wheel 81' is supported between the fork by axle 82, portions of the axle engaging the apertures in the fork, and secured to the ends of the axle are crank elements 83, the pin portion 84 adapted for engagement with an aperture in the lower portion of the front legs of a horse or other animal as shown in Figure 1.

Transversely mounted in the closed portion 70 is a shaft 85 that carries a cog wheel 86, and extending from each side of the closed portion 70 are tubular arms 87 that house the shaft 85. The ends of the shaft are provided with handles 88 that operate the cog wheel 86, that in turn operates the rack-bar, cable and guard-brake. In the nose of the rod 74 there is transversely mounted a rod 89, and secured to the ends of the rod is one end of a metal ribbon 90, the opposite ends of the ribbon being secured to the tubular arms 87, the metal ribbon simulating reins of a harness.

The body 95 of the horse or other animal is made in two sections that may be of wood or metal, and these sections may be secured to the frame 11 by any suitable means such as through bolts 96. The head 97 is made in two sections that are secured to the rod 74 by any suitable means such as through bolts 98. The inner faces of the body sections 95 and the head sections 97 if desired may be channeled out for engagement with the side rails 11 and the rod 74. To the hind quarter of the body sections 95 there is pivotally mounted the upper hind leg members 99, and to these members there is pivotally connected the upper end of the lower hind leg members 100. The lower hind leg members are provided with a bore that receives the pin portion 45 of the crank elements 44. To the body portion 101 of the head portion there is pivotally mounted the upper end of members 103, and to the lower end of members 103 there is pivotally connected the lower leg members 104.

The lower leg members 104 are provided with apertures or bores that receive the pin portions 84 of the crank elements 83. A saddle 105 is provided, the horn 106 of the saddle being provided with a bore that engages the end portion 107 of the rod 63.

In operating the vehicle, a child positions itself on the saddle 105, placing its feet in the stirrups 53. By pushing down, first on one stirrup and then on the other, movement is imparted to the rubber tired wheel 46 in the following manner. As one of the stirrups 53 is pushed down, the pivotally mounted rod 49 moves down pulling the chain 60 forward, the forward movement of the chain rotating sprocket wheel 32, movement of sprocket wheel 32 causing the dog 34 to engage one of the teeth in ratchet wheel 30, the dog 34 being held in engagement with the ratchet wheel 30 by spring 33. Movement is imparted to either a grooved wheel 35 or a sprocket wheel 38 which imparts movement to a belt 47 or chain 48 trained around pulley 42 or sprocket wheel 43 that is secured to rubber tired wheel 46. When the full downward stroke on one stirrup has been reached and downward movement is started on the other stirrup, as downward pressure is released on the first stirrup, this stirrup is pulled upwardly to its original position by spring 57. During movement of either the pulley wheel 42 or the cog-wheel 43, movement is imparted to the axle 41 the crank pin 44 operating the hind leg portions 99 and 100, thus simulating the natural movement of a horse or other animal. If it is desired to coast along without operating the stirrups, the grooved wheel 35 or sprocket wheel 38, ratchet wheel 30 and shaft 27 will rotate, while sprocket wheels 32 stay stationary. During movement of the vehicle the front leg portions 103 and 104 will move, simulating the natural movement of a horse or other animal through rotation of the rubber tired wheel 81 and the crank pins 84. To control the speed of the vehicle or to stop the vehicle, downward pressure on the handles 88 impart movement to the shaft 85 that moves the cog-wheel 86 in a counter-clockwise direction that moves the rack-bar 77, cable 79 and the guard-brake 67 upwardly, the rear end of the guard-brake engaging the rubber tired wheel 81'. When the handles 88 are released or pulled upwardly, the spring 81 moves the rear end of the guard-brake upwardly and pulls the cable 79 and the rock bar 77 downwardly.

From the above description it can be seen that we have provided a vehicle that may simulate an animal and one that may be driven either by a belt or link chain, that means are provided for driving the vehicle, or for coasting, with means for braking the speed of the vehicle or for stopping it. Also positive drive means are provided insuring constant movement of the vehicle without lost motion.

Having described our invention, we do not wish to be limited to the exact details, as changes may be made without departing from the scope of the claims hereto appended.

What is claimed is:

1. A wheeled vehicle comprising a frame, a head portion and a forked portion mounted to said frame for pivotal movement, wheels carried by said frame and forked portion, an upper rear, a lower rear and a forward transverse shaft carried by said frame, a cog-wheel carried by the wheel journaled on said lower shaft in said frame, sprocket wheels, a ratchet wheel and a cog-wheel carried by said upper rear shaft, said sprocket wheels freely movable on said shaft, a chain trained around the cog-wheel carried by said upper rear shaft and the cog-wheel carried by the wheel journaled on said lower rear shaft in said frame, drive means pivotally mounted on said forward transverse shaft mounted in said frame, said drive means having an L-shaped end, drive chains trained around the sprocket wheels, a dog carried by said sprocket wheels engageable with said ratchet wheel, one end of each of said drive chains secured to said drive means pivotally mounted on said forward transverse shaft, resilient means in said frame and having one end secured to said drive means pivotally mounted on said forward transverse shaft, the opposite end of said resilient means secured to said drive chains, and means in said head and forked portion for controlling the speed of said wheeled vehicle.

2. A wheeled vehicle comprising a frame, a head portion and a forked portion mounted to said frame for pivotal movement, wheels carried by said frame and forked portion, upper forward, upper rear, lower rear and lower forward transverse shafts carried by said frame, a pulley wheel carried by the wheel journaled on the lower rear shaft in said frame, sprocket wheels, a ratchet wheel and a pulley wheel carried by said upper rear transverse shaft, said sprocket wheels movable on said shaft, a belt trained around the pulley wheel carried by said upper rear shaft and the pulley wheel carried by the wheel journaled on said lower rear shaft in said frame, rollers carried by said upper forward transverse shaft in said frame, drive means pivotally mounted on said lower forward transverse shaft mounted in said frame, said drive means having an L-shaped end, drive chains trained around the sprocket wheels, a dog carried by said sprocket wheels engageable with said ratchet wheel, one end of each of said drive chains secured to said drive means pivotally mounted on said lower forward shaft, resilient means in said frame and having one end secured to said drive means pivotally mounted on said lower forward transverse shaft, the opposite end of said resilient means secured to said drive chain, and means in said head and forked portion for controlling the speed of said wheeled vehicle.

3. A device of the character described comprising a frame, a head and forked portion pivotally connected to said frame, wheels carried by said frame and forked portion, upper forward, lower forward, upper rear and lower rear transverse shafts carried by said frame, a cog-wheel connected to the wheel journaled on the lower rear shaft in said frame, sprocket wheels, ratchet wheels, and a cog-wheel carried by said upper rear shaft, said sprocket wheels freely movable on said shaft, a sprocket chain trained around said cog-wheel carried by said upper rear transverse shaft and the cog-wheel carried by the wheel journaled on said lower rear shaft in said frame, drive means pivotally mounted on said lower forward transverse shaft mounted in said frame, said drive means having an L-shaped end, drive chains trained around the sprocket wheels carried by said upper rear transverse shaft and the cog-wheels carried by said lower rear transverse shaft, a cog carried by said sprocket wheels engageable with said ratchet wheels, one end of said drive chain secured to said drive means pivotally mounted on said lower forward transverse shaft, springs in said frame and having one end secured to said drive means pivotally mounted on said lower forward transverse shaft, the opposite ends of said springs secured to said sprocket chains trained around said sprocket wheels and said cog wheels, a transverse shaft carried by said head, a rack-bar in said head, a pinion gear mounted on said transverse shaft in said head and engageable with said rack-bar, a brake guard mounted in said forked portion, a cable connecting said rack-bar and said brake guard, and a pair of handles connected to said transverse shaft in said head portion, said handles operating said pinion gear, rack-bar and brake-guard.

RAYMOND E. JAMES.
EDGAR L. PIERCE.

REFERENCES CITED

The following references are of record in the file of this patent:

UNITED STATES PATENTS

| Number | Name | Date |
| --- | --- | --- |
| 325,408 | Heilman et al. | Sept. 1, 1885 |
| 455,864 | Cornelius | July 14, 1891 |
| 659,267 | Thompson et al. | Oct. 9, 1900 |
| 1,366,372 | Finley | Jan. 25, 1921 |
| 1,675,399 | Witherell et al. | July 3, 1928 |
| 2,504,000 | Coleman | Apr. 11, 1950 |